Sept. 28, 1971     H. J. DIRKSEN ET AL     3,608,453
DEVICE FOR TERRAIN PHOTOGRAPHY BY MEANS OF SCANNING SYSTEMS
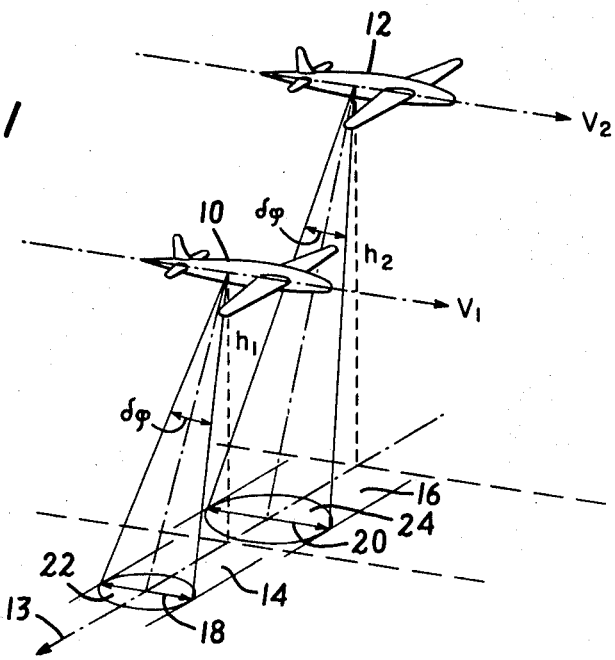
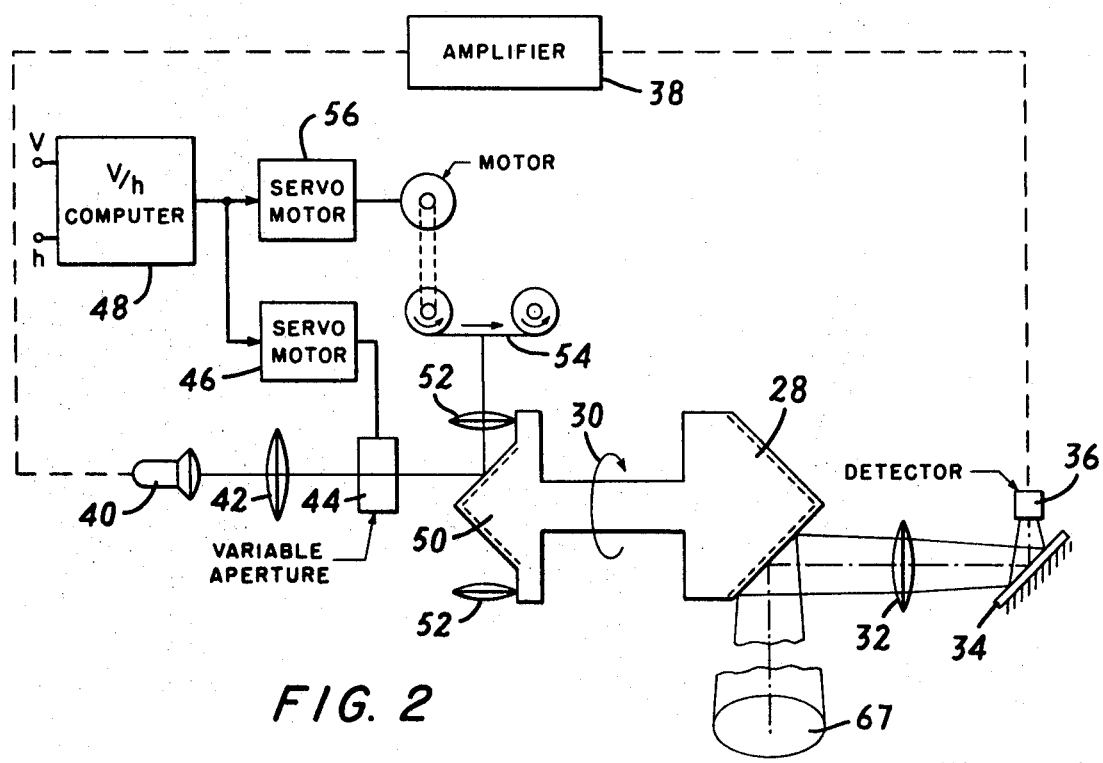

Sept. 28, 1971  H. J. DIRKSEN ET AL  3,608,453
DEVICE FOR TERRAIN PHOTOGRAPHY BY MEANS OF SCANNING SYSTEMS
Original Filed March 20, 1968  3 Sheets-Sheet 2
FIG. 3
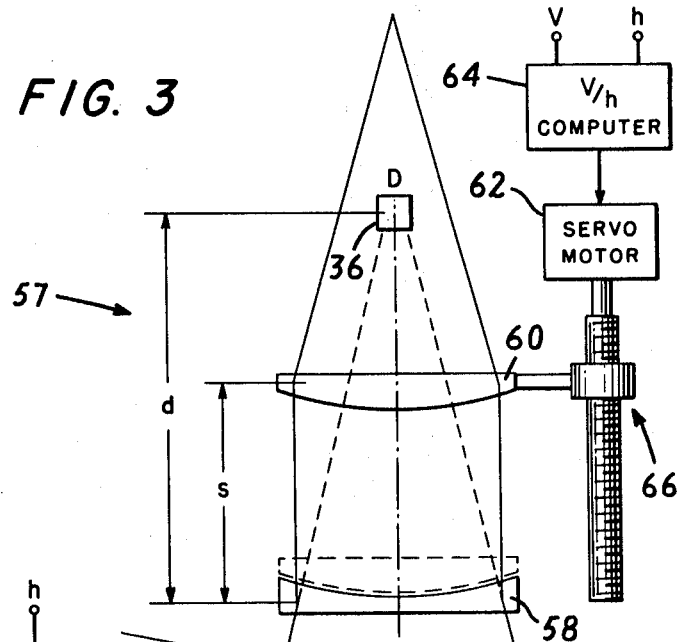
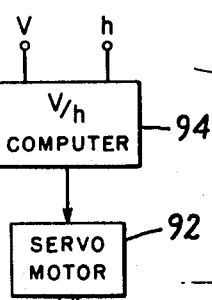
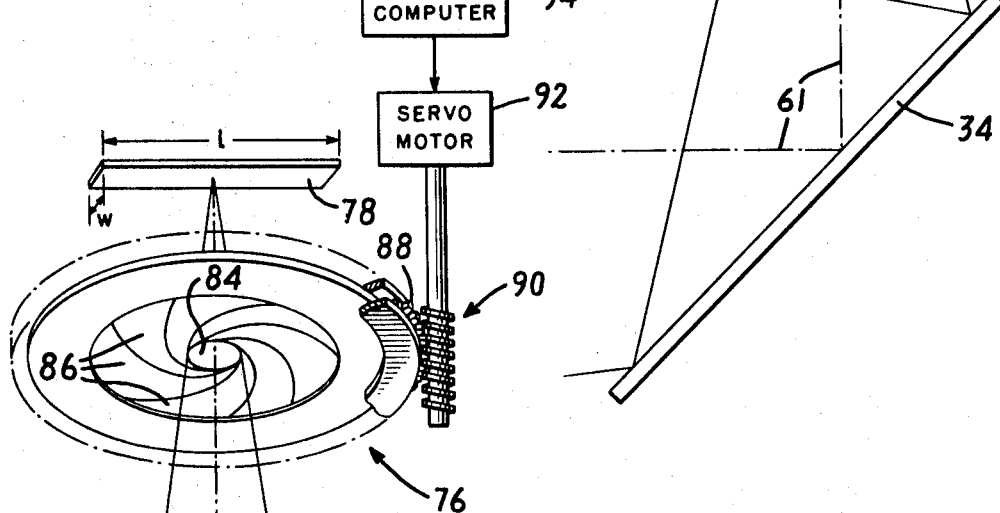
FIG. 4
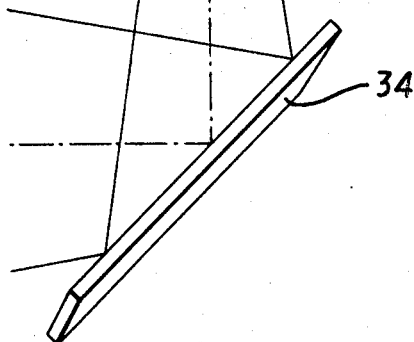
INVENTORS.
HUIBERT J. DIRKSEN &
ARIE N. de JONG
BY Brumbaugh, Graves,
Donohue & Raymond
their ATTORNEYS Sept. 28, 1971 H. J. DIRKSEN ET AL 3,608,453
DEVICE FOR TERRAIN PHOTOGRAPHY BY MEANS OF SCANNING SYSTEMS
Original Filed March 20, 1968 3 Sheets-Sheet 3

INVENTORS.
HUIBERT J. DIRKSEN &
ARIE N. de JONG
BY
their ATTORNEYS

United States Patent Office 3,608,453
Patented Sept. 28, 1971

3,608,453
DEVICE FOR TERRAIN PHOTOGRAPHY BY MEANS OF SCANNING SYSTEMS
Huibert J. Dirksen, The Hague, and Arie N. de Jong, 's Gravenzande, Netherlands, assignors to Nederlandse Organisatie voor Toegepast-Natuurwetan-Schappelijk Onderzoek ten Behoeve van de Rijksverdediging, The Hague, Netherlands
Continuation of application Ser. No. 714,475, Mar. 20, 1968. This application July 1, 1970, Ser. No. 51,451
Claims priority, application Netherlands, Mar. 29, 1967, 6704503
Int. Cl. G03b 29/00
U.S. Cl. 95—12.5   6 Claims

ABSTRACT OF THE DISCLOSURE

In airborne equipment for surveying terrain, in particular by infrared photography, which includes a mirror rotating at a constant speed to scan the terrain in a series of parallel strips extending transverse to the line of flight of the aircraft and apparatus for projecting the images thus obtained onto a moving film, the improvement of apparatus for varying the field of view of the scanning mechanism proportional to the $v/h$ ratio of the aircraft so that the scanned terrain strips abut to yield a photographic reproduction of the terrain having no omitted portions and substantially no duplicated portions. Three embodiments of defocusing systems for carrying out the invention are described.

BACKGROUND OF THE INVENTION

This application is a continuation of the patent application Ser. No. 714,475, filed Mar. 20, 1968, by the inventors named herein.

The invention relates to an improved device for photographing terrain from either an aircraft or another object moving over the terrain.

With airborne scanning devices, the terrain to be photographed is scanned strip by strip, and the image of the scanned strips is recorded on a film. In a refinement of the prior art devices, the strips scanned are caused to abut on the film, thus obtaining a photographic reproduction which is more easily read, by placing means, such as a diaphragm, having a variable aperture in front of the film and then varying the aperture dimensions according to the $v/h$ ratio of the aircraft.

The film is generally driven at a speed proportional to the $v/h$ ratio of the aircraft to reduce distortion resulting from motion of the image relative to the aircraft; the scanning means, which commonly is a mirror, rotates to scan the terrain, with, however, the speed of the rotation either held constant or varied according to the $v/h$ ratio of the aircraft.

The latter choice is generally dictated by economic considerations, since varying the rotational speed of scanning provides the great advantage that the percentage of the terrain scanned can be maintained substantially constant throughout variations in either the velocity or the height of the aircraft, but that the means for accomplishing this are relatively complicated and expensive.

A roofedge-mirror, which is a combination of two mirrors at a right angle, rotates about an axis that is substantially parallel with the line of flight to scan strips of the terrain extending perpendicularly to the line of flight. The mirrors preferably form an angle of 45° with the axis of rotation. After scanning, the image is projected by the mirror to the photographing means, including the moving film.

Distortion-free pictures are obtained by choosing the film velocity $v_f$ in accordance with the equation:

$$v_f = Cb\frac{v}{h} \quad (1)$$

in which C is a constant that depends on the magnitude of the scanning sweep, $b$ is the width of the film, $v$ is the ground velocity of the scanning aircraft, and $h$ is the altitude of the scanning aircraft relative to the scanned terrain. For a scanning sweep of 120°, C is equal to $\frac{3}{2}\Pi$. With scanning systems heretofore known, a distortion-free photograph is obtained by varying the film velocity $v_f$ according to Equation 1, which, since C and $b$ are usually predetermined, means varying $v_f$ according to the $v/h$ ratio of the aircraft. An example of this can be seen in the Blackstone Pat. No. 2,945,414. The value for $v/h$ varies in practice from about 0.7 to 14.

Transferring the image of the scanned strips to the film takes place by modulating a discharge tube by means of the electric signal emitted by the detector. The resulting light signal is projected through a slit to a second mirror rotating synchronously with the scanning mirror. With a microscope objective lens rotating along the same axis as the second mirror, an image of the slit is longitudinally projected on the film. By varying the slit length by means of an automatically controlled diaphragm, the width of the image is adapted to the value required for the abutment of the successive photographed strips.

Although the prior art scanning devices thus obtain a photographic reproduction of the terrain which appears complete because the scanned strips of the terrain are modified during transfer to the film, these scanning devices have the disadvantage that the strips of the terrain scanned do not necessarily abut. That is, for a constant rate and angle of scanning, the width of the scanned strips of terrain vary proportional with the height of the aircraft. Thus for variations in the altitude of the scanning aircraft, which in many cases are unavoidable, scanned strips of the terrain are obtained which either overlap, thus duplicating certain portions of the terrain on the photograph, or which are spaced from each other, thereby completely omitting certain portions of the terrain from the photograph. For the constant rate of scanning condition, which, taken alone, is a desirable objective because of the inertial resistance of the scanning equipment to changes in rotational speed, variations in the velocity of the scanning aircraft produces corresponding variations in the on center spacing between the scanned terrain strips. Thus where the width of the scanned strips are held substantially uniform, the scanning can again yield terrain strips which either overlap or omit portions of the terrain.

SUMMARY OF THE INVENTION

There is provided in accordance with the invention, a device for varying the filed of view of the conventional scanning means responsive to the $v/h$ ratio of the aircraft so that successively scanned strips of terrain abut to provide a photographic reproduction of the terrain which includes all of the terrain within the scanning range of the aircraft, but substantially without duplication caused by purposefully overlapping adjacent scanned strips.

The mathematical relationships for obtaining abutting scanning strips of terrain are first determined. The terrain is scanned in a plurality of strips which extend substantially transversely relative to the line of flight of the aircraft. The width of each scanned strip of terrain, as measured in the direction parallel to the line of flight of the aircraft, corresponds to the field of view in that direction of the scanning means; that is, what is "seen" by the scanning means in that direction. In optical terminology, the "field of view" is the area visible through the lens of an optical instrument, and is often expressed in terms of a parameter of the area, such as the diameter of a circular field of view. Hereinafter, the field of view of the scanning means according to the invention refers, unless otherwise specified, to the instantaneous width of the terrain strip measured in a direction parallel to the line of flight of the aircraft.

The minimum width of the terrain strips which are scanned on the ground depend on the diameter $d_c$ of the detector, the focal distance $f_o$ of the optical system used, and the aircraft height $h$. This minimum width is defined by the equation:

$$h \frac{d_c}{f_o} = h \delta \phi \quad (2)$$

for small values of $\delta\phi$, where $\delta\phi$ is the instantaneous angle of view of the scanning device in radians.

The distance between two successive scannings depends on the aircraft velocity $v$, the aircraft height $h$, the number of scannings per rotation of the scanning mirror $k$, and the number of rotations per second of the scanning mirror $n$. Abutting scannings are obtained for $$\frac{v}{h} = k n \delta \phi \quad (3)$$

It is readily apparent that this is only possible for one $v/h$ value as long as the size of the detector $d_c$, the focal distance $f_o$, and the position of the detector with regard to the focal plane are not changed.

According to the invention, abutting scanning terrain strips are obtained by varying the field of view of the scanning apparatus directly proportional to the aircraft height $h$ and inversely proportional to the aircraft velocity $v$. In a further improvement according to the invention, only the field of view of the scanning means measured in a direction parallel with the line of flight is thus varied, whereas the field of view measured in the direction of scanning is left substantially unaffected.

According to the preferred embodiments of the invention, the field of view of the scanning device is varied in three ways:

(1) The scanning apparatus is provided with an optical system in which defocusing of the image in the direction, relative to the image, corresponding with the line of flight is carried out in accordance with the $v/h$ ratio of the aircraft and no defocusing takes place in the direction perpendicular to the line of flight.

(2) The scanning apparatus is provided with a zoom optical system having its focal distance in a direction corresponding to the line of flight controlled automatically by the $v/h$ ratio of the aircraft, whereas the focal distance in the direction perpendicular to the line of flight remains unchanged.

(3) The detector of the scanning device, a photo-electric cell, is made oblong in shape with a length/width ratio equal to $v/h_{max}$ divided by $v/h_{min}$, the length of which corresponds to the line of flight and a diaphragm is placed in front of the detector having an aperture which is automatically controlled responsive to the $v/h$ ratio of the aircraft.

BRIEF DESCRIPTION OF THE DRAWINGS

In the accompanying drawings:

FIG. 1 is a schematic representation in perspective of two scanning aircraft flying at different heights over the terrain.

FIG. 2 is a schematic view of scanning apparatus prior to installation of the improvement according to the invention.

FIGS. 3–5 are schematic views of three embodiments of the invention as installed in the apparatus shown in FIG. 2.

FIGS. 6a and 6b to 8a and 8b are schematic views showing comparisons between the three different widths of the terrain strips scanned and the image photographed for three different scanning devices.

DESCRIPTION OF EXEMPLARY EMBODIMENTS

Figure 5:
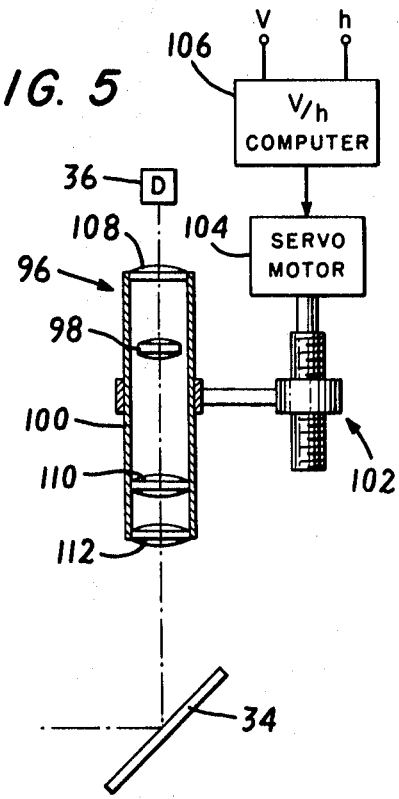

In FIG. 1, two aircraft 10 and 12 employing conventional scanning apparatus are depicted flying in a direction of flight indicated by the arrows $v_1$ and $v_2$, respectively, over the terrain. The aircraft 10 is flying at a lower altitude $h_1$ than the altitude $h_2$ of the aircraft 12. Both aircraft 10 and 12 are scanning, from left to right in the direction of the arrow 13, strips of the terrain 14 and 16, respectively. The width of each strip 14 and 16 is indicated by the arrows 18 and 20, respectively, and it can be seen that this width is measured in a direction parallel to the line of flight of the aircraft. Since both aircraft 10 and 12, while scanning at the same angle $\delta\phi$, are flying at different heights, it is apparent that the widths of the scanned strips of terrain 14 and 16 must be different, and that the strip 16 scanned by the higher-flying aircraft 12 is wider than the strip 14. The areas indicated by reference numerals 22 and 24 correspond to the instantaneous area of the terrain visible to the scanning means contained in the aircraft 10 and 12, respectively. These areas, in turn, are defined as the field of view of the scanning means. The field of view can be expressed in terms of its dimension along a given line, and, for convenience, it is preferred to express the field of view of the scanning means as the distance visible along a line parallel to the line of flight of the aircraft. Since the scanned strips extend substantially transversely to the line of flight, this distance corresponds to the width of the terrain strip, which for aircraft 10, for example, is indicated by the arrow 18. It should be kept in mind, however, that the field of view could also be expressed as the distance seen in any other direction, such as in the direction of scanning as indicated by the arrow 13.

FIG. 2 depicts a representative scanning apparatus according to the prior art, which is also suitable for installation of the improvement according to the invention. The roofedge scanning mirror 28 scans two terrain strips per complete rotation, as indicated by the arrow 30, about its axis. The radiation received from the terrain is reflected by the mirror 28, through a focusing objective lens 32, to a mirror 34 which reflects the rays to a photo-electric detector 36.

The detector 36 emits an electrical output signal, which, after amplification by an amplifier 38, controls a small modulator-lamp 40. The modulated light passes through a field lens 42 to a diaphragm 44. The opening of the diaphragm 44 is in the shape of a slit, the length of which is automatically varied by the servomotor 46 responsive to the signal generated by the $v/h$ computer 48. After being partially blocked by the diaphragm 44, the light falls upon a second roofedge mirror 50, which rotates conjointly with the scanning mirror 28. The two microscope-objectives 52 are coupled to the mirror 50 and project the reflected image onto the moving film 54. It is readily apparent that the diaphragm 44 affects not what is included in the image, but merely thhe image size so that the photographed strips abut. Although successive scanned strips which initially abut at the point of minimum width can be obtained by the apparatus shown in FIG. 2 for aircraft flying at both a constant velocity and height, it is readily apparent to a person skilled in the art that the strips scanned by this apparatus can not continue to abut for variations in the velocity and height of the aircraft.

The device according to the invention varies the instantaneous width of the terrain strip which is detected by the scanning apparatus according to the $v/h$ ratio of the aircraft. FIG. 3 depicts one embodiment of a lens or defocusing system 57 for varying the field of view of the scanning apparatus provided in FIG. 2. It is a particular advantage of the apparatus shown in FIG. 3 that the width of the scanned terrain element 67 is instantaneously varied in a direction measured parallel to the line of flight of the aircraft as indicated by the arrows $v_1$ and $v_2$ in FIG. 1 independently of variations measured in the direction of scanning as indicated by the arrow 13 in FIG. 1. This is accomplished by providing a defocusing system 57 having two cylindrical lenses. A plano-concave lens 58 is positioned in the path of the radiation reflected from the mirror 34 to the detector 36 at a fixed distance $d$ from the detector 36. A plano-convex lens 60 is similarly mounted in the path of the radiation reflected from the mirror 34 to the detector 36 and facing the lens 58; however, the lens 60 is slidingly mounted for movement parallel to the path of travel of the radiation. Upon movement of the lens 60 toward and away from the lens 58, a varying amount of the peripheral radiation, corresponding to the edges of the scanned terrain strips, can be directed to either strike or bypass the detector 36. For example, for the position of the lens 60 indicated in dotted lines in FIG. 3, all of the incident radiation also indicated by the dotted lines strikes the detector 36, whereas for the position of the lens 60 shown in solid lines, much of the peripheral radiation passes the detector 36.

Conventional apparatus can be used to slidingly move the lens 60. For example, a conventional servomotor 62, responsive to a $v/h$ control signal produced by a computer 64, which may be the same computer 48 shown in FIG. 2, moves the lens 60 through a drive 66, which may be, for example, a conventional screw drive as shown. The computer 64 receives its signal from the velocity and height gauges (not shown) which are conventional equipment on aircraft used for this type of terrain photography.

A person skilled in the art can readily determine the dimensional relationships among the components shown in FIG. 3 to provide variations in the instantaneous field of view to obtain scanned terrain strips which abut throughout variations of the $v/h$ ratio of the aircraft from about 0.7 to 14. An illustrative determination of these dimensions is herein presented for the embodiment shown in FIG. 3.

The width of the terrain strip $w$, corresponds to the field of view of the scanning apparatus measured in the line of flight of the aircraft. The field of view, in turn, is related to the angle of scanning $\delta\phi$ measured in a plane passing through the line of flight. For the airplane scanning directly downward, the width $w$ can be expressed by the equation:

$$w = h\delta\phi \quad (4)$$

and it is readily apparent that the width $w$ must vary directly as the angle of scanning.

Where all values are in mks units, the magnitude of the instantaneous angle of scanning in the line of flight $\delta\phi_i$ can be expressed by the equation:

$$\delta\phi_i = \delta\phi_o + \frac{sD_o}{f_o^2} \quad (5)$$

in which $\delta\phi_o$ is the minimum value of the instantaneous angle of scanning in the line of flight as determined by substituting the appropriate values in Equation 3 above, $s$ is the distance between the lenses 58 and 60, and $D_o$ is the diameter of the objective lens 32. Solving Equation 5 for $s$ and substituting for $\delta\phi$ from Equation 3 yields the following equation:

$$s = \frac{f_o^2}{D_o k n} \left[ \left(\frac{v}{h}\right)_i - \left(\frac{v}{h}\right)_{\min} \right] \quad (6)$$

It is apparent from Equation 6 that as the $v/h$ ratio of the aircraft increases, that is, as the velocity $v$ of the aircraft increases or as the height $h$ of the aircraft decreases, or both, the distance $s$ between the lenses 58 and 60 increases so that radiation of a part of the scene impinges on the detector 36 of a surface which is more extended in the line of flight than in the scan direction. To illustrate the application of Equation 6 to the defocusing apparatus described above, recourse is made to an equal apparatus constructed in accordance with the present invention in which the following values were derived for the parameters of Equation 6:

| Parameter: | | Value |
|---|---|---|
| $v/h_{\max}$ | sec.$^{-1}$ | 14 |
| $f_o$ | cm | 17 |
| $k$ | | 2 |
| $n$ | sec.$^{-1}$ | 200 |
| $D_o$ | cm | 10 |

The maximum spacing $s_{\max}$ between the lenses 58 and 60 is found by substituting the maximum value found in practice for $(v/h)_i$ which has been found to be 14, along with the values listed above for the parameters. Upon solving Equation 6, $s_{\max}$ is found to be about 1 cm.

The dimensions of the cylindrical lenses 58 and 60 depend on the distance $d$ of the plano-concave lens 58 from the detector 36. The distance $d$, in turn, is equal to the sum of $s_{\max}$ plus a distance corresponding to the minimum distance the plano-convex lens 60 can approach to the detector 36. The focal length of the plano-concave lens 58 is then set equal to this distance $d$. For the arrangement of lenses shown in FIG. 3, it is apparent to a person skilled in the art that when observed in a plane perpendicular to the axes of the cylindrical lenses 58 and 60, the radiation beam is parallel in the zone between the two lenses 58 and 60 while it is normally converging outside this zone, whereas in a plane through the axes of the cylindrical lenses 58 and 60, the convergence of the radiation beam is unaffected. This provides defocusing in only one direction relative to the image, and upon proper orientation of the cylindrical lenses 58 and 60, this direction can be established as that one parallel to the line of flight of the aircraft.

FIGS. 4 and 5 show defocusing apparatus according to the invention which operate similarly to the apparatus shown in FIG. 3, in that the field of view of the scanning apparatus as seen by the detector 36 is varied according to the $v/h$ ratio of the aircraft. In FIG. 4, a diaphragm 76 having a variable aperture is placed in the path of the radiation reflected from the mirror 34 to the detector 78 similarly to the placement of the defocusing system 57 in FIG. 3.

The detector 78 is oblong in shape, with the ratio of the length $l_{ma}$ to the width $w$ being equal to $v/h_{\max}$ divided by $v/h_{\min}$. Providing a detector 78 having such a shape is well within the ability of a person having ordinary skill in the art. The diaphragm 76 may be any of several types known to a person skilled in the art, such as the conventional leaf diaphragm provided in cameras. The diaphragm 76 has an aperture 84 which is variable responsive to the $v/h$ ratio of the aircraft. In the illustrative diaphragm 76 shown in FIG. 4, the leaves 86 are interlocked by the ring gear 88. The ring gear 88 is turned by a drive 90, which may be a conventional screw drive, which is controlled by the servomotor 92 responsive to a $v/h$ signal from the computer 94. As the $v/h$ ratio of the aircraft increases, the aperture 84 opens to allow radiation generated by the edges of the scanned terrain strip to strike the detector.

In the apparatus shown in FIG. 5, a zoom lens system 96 is installed in the path of the radiation reflected from the mirror 34 to the detector 36. The zoom lens 96 may be of any of the several types known to persons skilled in the art. In the embodiment shown in FIG. 5, the lens element 98 is fixed and the movable barrel 100 is mounted for sliding movement parallel to the axis of the incoming radiation. A drive 102, which may be any of the several types known to persons skilled in the art, such as a screw drive, which is controlled by the servomotor 104 responsive to a $v/h$ signal from the computer 106, drives the movable barrel 100. It is within the ordinary level of skill of a person skilled in the art to provide a zoom lens system 96 which has the further advantage that the focal distance is varied so that the image is substantially affected only in one direction, with the orientation of the lens system 96 being selected so that this direction corresponds to the width of the terrain strip measured in a direction parallel to the line of flight of the aircraft. For example, this may be obtained by making the lenses 98, 108, 110 and 112 cylindrical lenses.

Figure 6A:
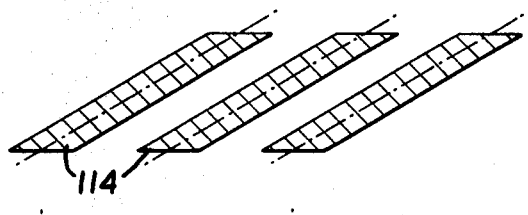
Figure 6B:
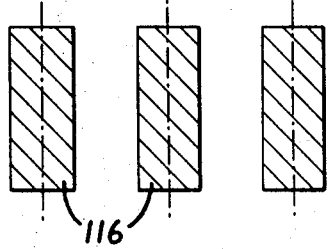
Figure 7A:
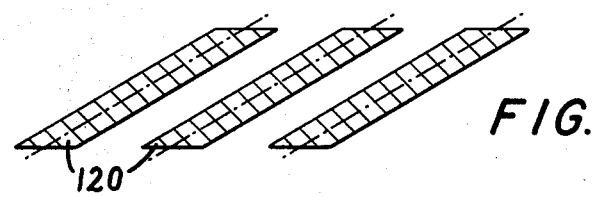
Figure 7B:
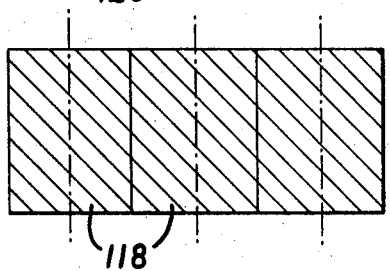
Figure 8A:
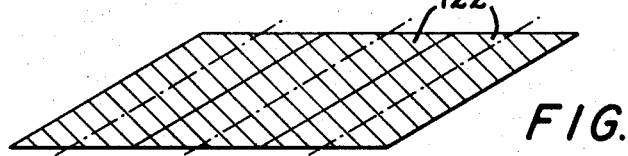
Figure 8B:
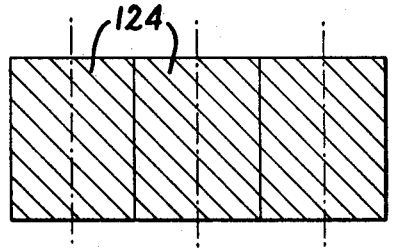

In FIGS. 6–8 are shown the images scanned as opposed to the images recorded on the film for three scanning systems. FIGS. 6a, 7a and 8a depict the scanning pattern over the terrain, with the strips oriented similarly to the strips 14 and 16 in FIG. 1. FIGS. 6b, 7b 8b depict the corresponding photographic reproductions of the terrain strips scanned in FIGS. 6a, 7a and 8a respectively.

FIG. 6 depicts the scanning pattern and photographic reproduction for an early model of scanning apparatus. It can be seen that neither the terrain strips 114 nor the film strips 116 abut; thus a considerable part of the terrain is not recorded, and the film strip is difficult to read.

FIG. 7 shows an improved scanning apparatus, in which the film strips 118 are caused to abut even though the scanned terrain strips 120 do not abut. This provides the improved result that the film is considerably easier to read, even thought it is incomplete.

FIG. 8 depicts the scanning pattern and photographic reproduction when scanning apparatus employing the present invention is provided. It can be seen that the terrain strips 122 abut, and that the photographed strips 124 also abut, thereby providing both a complete scanning of the terrain and a photographic reproduction which is easy to read.

The above-described embodiment of the invention is intended to be merely exemplary, and those skilled in the art can make numerous modifications and variations without departing from the spirit and scope of the invention. All such modifications and variations are intended to be included within the scope of the invention, as defined in the appended claims.

We claim:

1. A device for terrain photography, in particular infrared photography from an aircraft, in which strips of the terrain lying transverse to the line of flight of the aircraft are scanned, said scanning forming image elements which image elements are detected and projected onto a photographic film, comprising means aboard the aircraft for automatically determining the velocity ($v$) and height ($h$) of the aircraft and for generating a $v/h$ control signal corresponding to the $v/h$ ratio of the aircraft, and means for automatically changing the magnitude of the field of view of the device responsive to said $v/h$ control signal, whereby the scanned strips of terrain are caused to abut.

2. A device according to claim 1, wherein said means for automatically changing the magnitude of the field of view includes an oblong photoelectric detector having a length:width ratio equal to $(v/h)_{max.}:(v/h)_{min.}$ a diaphragm having an aperture, said diaphragm being placed in the photo path of said detector, and means for automatically controlling said aperture responsive to said $v/h$ control signal.

3. A device according to claim 1, wherein said means for automatically changing the magnitude of the field of view includes a zoom optical system having a focal distance in the direction corresponding with the line of flight, which focal distance is automatically controlled by said $v/h$ control signal, and a focal distance in the direction perpendicular to the line of flight which remains unchanged.

4. A device according to claim 1, wherein said means for automatically changing the magnitude of the field of view includes an optical system having a plano-convex and a plano-concave cylindrical lens mounted together to form a plane sheet, said plano-convex lens being slidably mounted, and means fod sliding said plano-convex lens responsive to said $v/h$ control signal.

5. A device according to claim 4, wherein said means for sliding said plano-convex lens responsive to said $v/h$ control signal includes a servo motor adapted to cause said plano-convex lens to slide, said servo motor being responsive to said $v/h$ control signal.

6. A method of photographing terrain, in particular by infrared photography from an aircraft, in which strips of the terrain lying transverse to the line of flight of the aircraft are scanned, said scanning forming image elements which image elements are detected and projected onto a photographic film, comprising the steps of
  (a) generating a $v/h$ control signal aboard the aircraft corresponding to the velocity ($v$) of the aircraft divided by the height ($h$) of the aircraft,
  (b) initially obtaining a field of view which causes successive strips of terrain to abut for any selected magnitude of said $v/h$ control signal, and
  (c) varying said field of view responsive to changes in said $v/h$ control signal, which changes are relative to said selected magnitude, whereby the scanned strips of terrain are caused to continuously abut.

References Cited
UNITED STATES PATENTS

| | | | |
|---|---|---|---|
| 3,364,830 | 1/1968 | Aschenbrenner et al. | 95—12.5 |
| 3,163,098 | 12/1964 | Kierstead et al. | 95—12.5 |
| 2,922,351 | 1/1960 | Hering | 95—12.5X |
| 3,234,865 | 2/1966 | Scott | 95—12.5 |

JOHN M. HORAN, Primary Examiner

T. A. MAURO, Assistant Examiner